United States Patent [19]
Delprat et al.

[11] Patent Number: 5,617,412
[45] Date of Patent: Apr. 1, 1997

[54] FRAME/MULTIFRAME STRUCTURE FDMA SYSTEM AND CORRESPONDING SIGNAL

[75] Inventors: Marc Delprat, Le Chesnay; Vianney Andrieu; Frédéric Gourgue, both of Paris; Gladys Gaydu, Rosny Sous Bois; Charles Nouchi, Suresnes, all of France

[73] Assignee: Alcatel N.V., Rijswijk, Netherlands

[21] Appl. No.: 420,604

[22] Filed: Apr. 12, 1995

[30] Foreign Application Priority Data

Apr. 15, 1994 [FR] France .................. 94 04556

[51] Int. Cl.⁶ ........................... H04B 7/208
[52] U.S. Cl. ............ 370/281; 455/33.2; 455/34.1; 455/54.1; 455/57.1; 379/60; 379/63; 370/344; 370/496; 370/522
[58] Field of Search ............... 370/24, 30, 31, 370/69.1, 70, 76, 110.1; 455/33.1, 33.2, 34.1, 49.1, 53.1, 54.1, 56.1, 57.1; 379/58, 59, 60, 63

[56] References Cited

U.S. PATENT DOCUMENTS

| | | | |
|---|---|---|---|
| 4,549,293 | 10/1985 | Christian et al. | 370/95 |
| 4,573,207 | 2/1986 | Smith et al. | 455/34.1 X |
| 5,235,598 | 8/1993 | Sasuta | 370/110.1 |
| 5,479,410 | 12/1995 | Paavonen | 370/95.3 |

FOREIGN PATENT DOCUMENTS

| | | | |
|---|---|---|---|
| 0532103A1 | 3/1993 | European Pat. Off. | H04B 7/26 |
| 0564429A2 | 10/1993 | European Pat. Off. | H04Q 7/00 |
| 2696602A1 | 4/1994 | France | H04B 7/26 |
| WO9325017 | 12/1993 | WIPO | H04J 3/12 |

OTHER PUBLICATIONS

French Search Report FR 9404556.

*Primary Examiner*—Russell W. Blum
*Attorney, Agent, or Firm*—Sughrue, Mion, Zinn, Macpeak & Seas

[57] ABSTRACT

In a digital half-duplex frequency division multiple access radio system a mobile station is either sending or receiving. For each call between a mobile station and a base station, a first frequency is allocated for the up link direction (from the mobile station to the base station) and a second frequency is allocated for the down link direction (from the base station to the mobile station). The signals exchanged by the stations are organized in frames of predetermined fixed duration grouped into multiframes comprising a predetermined number of frames including at least one control frame. At least some of the control frames are listening frames during which the sending mobile station interrupts sending, switches to receive mode and (if appropriate) reverts to send mode.

19 Claims, 3 Drawing Sheets

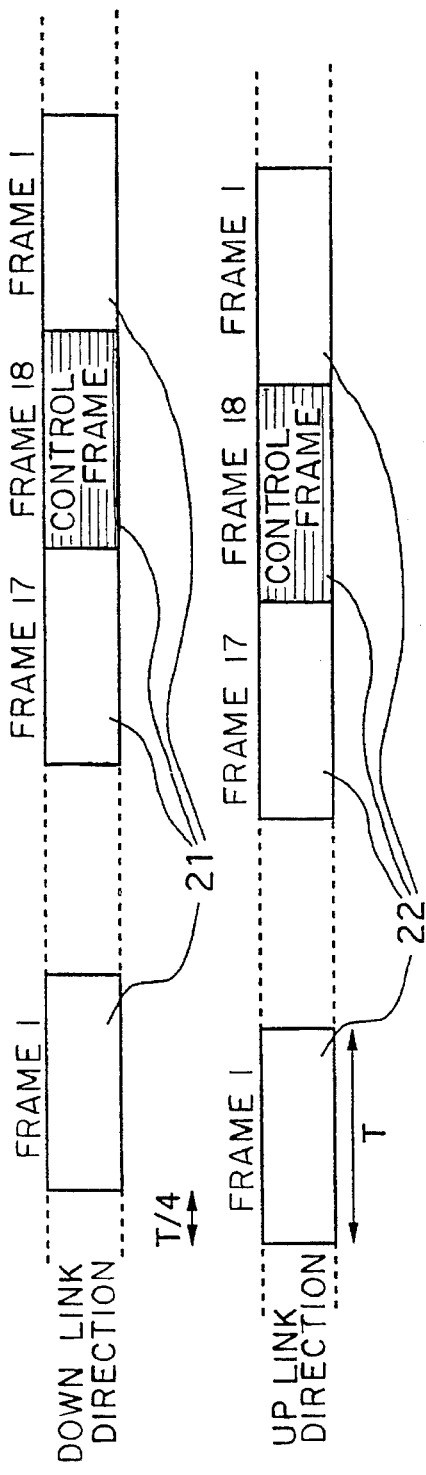
Fig. 2
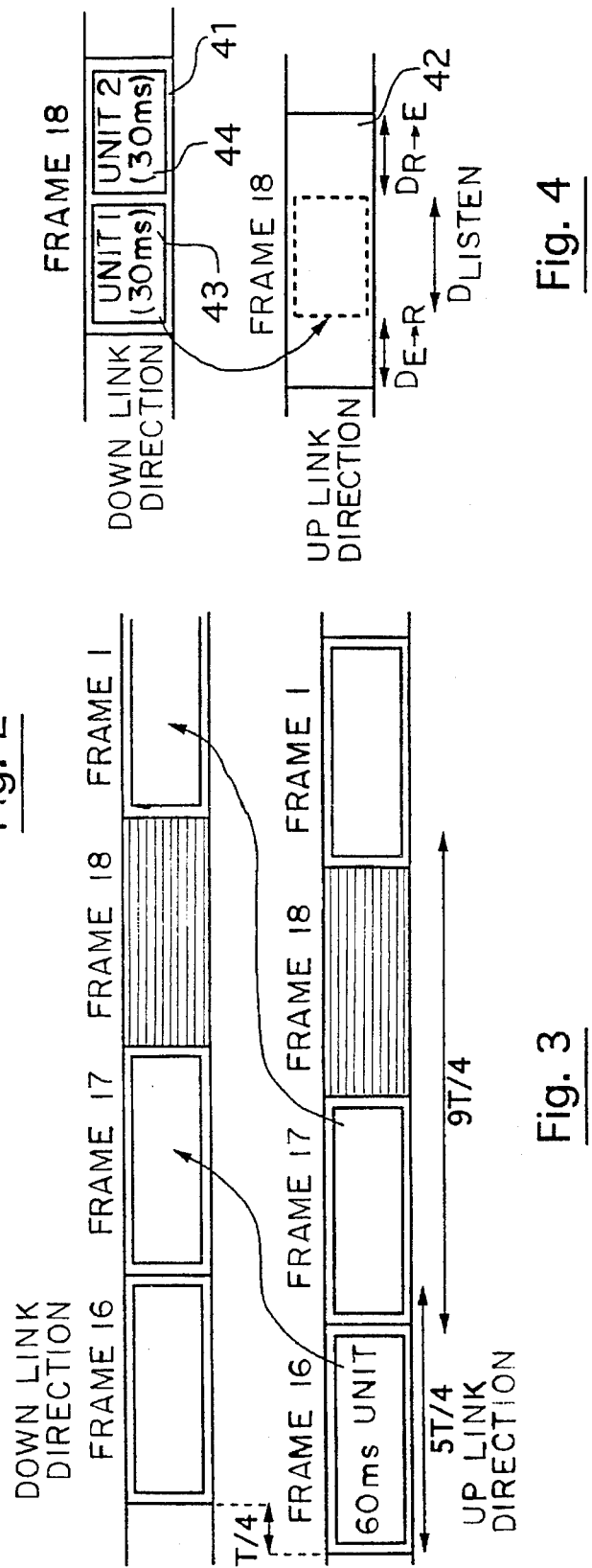
Fig. 4
Fig. 3

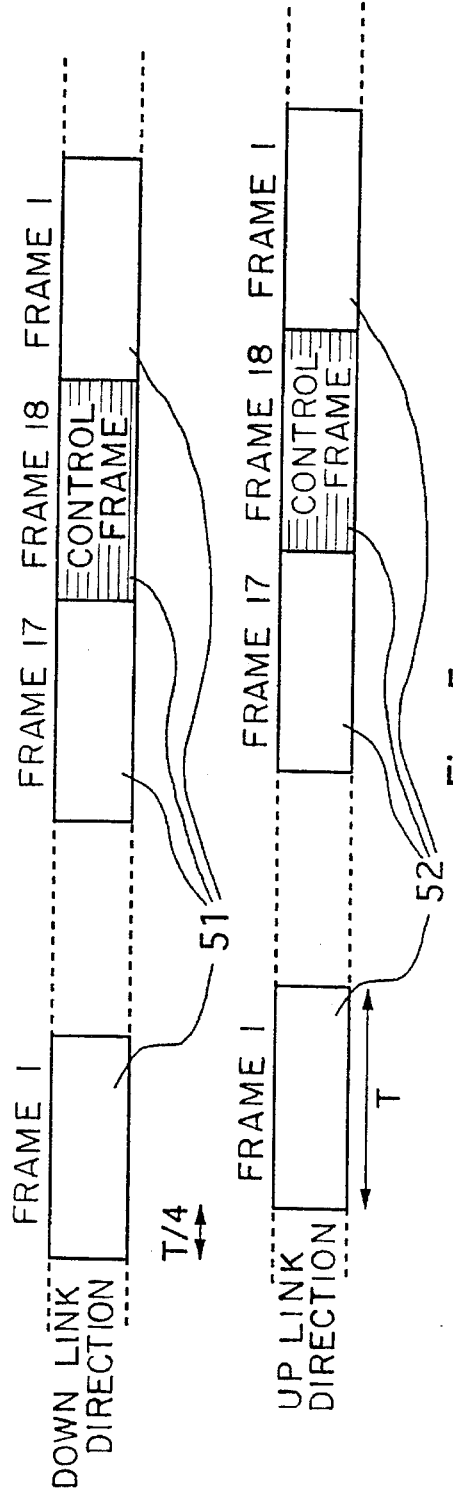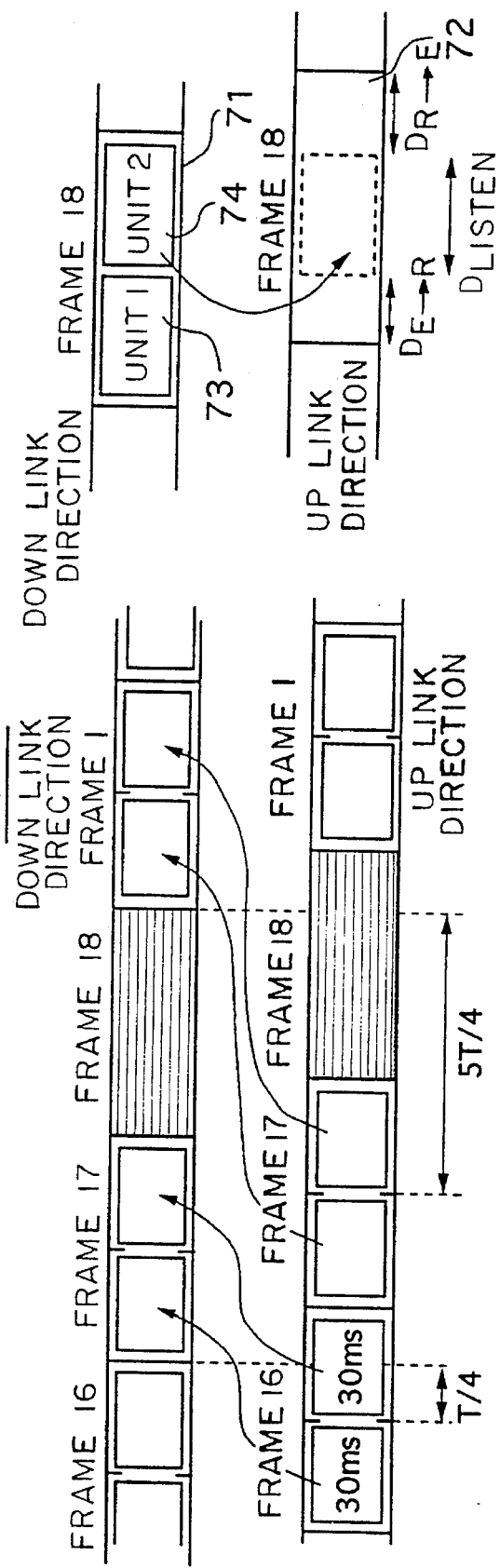

FRAME/MULTIFRAME STRUCTURE FDMA SYSTEM AND CORRESPONDING SIGNAL

BACKGROUND OF THE INVENTION

1. Field of the Invention

The field of the invention is that of multiplexed data communication by radio and in particular half-duplex radio systems in which a mobile station cannot send and receive simultaneously.

The invention finds an advantageous application in cellular mobile radio systems such as the GSM system (Global System for Mobile communications). The invention has been developed in particular for the TransEuropean Trunk Radio (TETRA) system which is a PMR (Professional Mobile Radio) system for networks used by emergency services, taxis, etc.

2. Description of the Prior Art

In this type of system stable calls in the base station to mobile station direction (up link direction) or in the mobile station to base station direction (down link direction) are conveyed on traffic channels (TCH).

Digital radio systems usually operate in TDMA (Time-Division Multiple Access) mode, including TETRA type systems.

In TDMA mode each traffic channel is allocated a transmission frequency (or a set of frequencies in the GSM system, which uses frequency hopping) which is shared by time-division multiplexing between a plurality of calls with different mobile stations (typically four in the TETRA system or eight at present in the GSM system).

Time-division multiplexing entails dividing time into frames of fixed and predetermined duration, the frames being in turn divided into time slots. Each call is associated with one or more time slots. Thus a frame comprising N time slots can correspond to N calls, each mobile station communicating in one time slot of each frame. At present N=4 in TETRA systems and N=8 in GSM systems.

Each call can convey either data or speech signals coded digitally at a low bit rate (below 16 kbit/s).

A new generation of radio systems is currently undergoing standardization (in particular TETRA type systems), and in these systems it is proposed to substitute FDMA (Frequency-Division Multiple Access) for TDMA.

In FDMA mode each call between a base station and a mobile station is associated with a first frequency for the up link direction (from the mobile station to the base station) and a second frequency for the down link direction (from the base station to the mobile station). Operation is continuous in time rather than divided into time slots as in TDMA mode.

The combination of FDMA mode and half-duplex operation implies that a mobile station is either sending continuously (on a first frequency) or receiving continuously (on a second frequency).

Although continuous reception does not pose any particular problem, the same cannot be said for continuous transmission.

Continuous transmission rules out the transmission of signalling associated with the call, unless interruption of traffic is tolerated. By signalling associated with the call is meant, for example, instructions or parameters connected with the operation of the network and relating to the management of the traffic channel in use.

Also, there is no simple way to implement a "listen" function with continuous transmission. A "listen" function is very important, however, since it enables applications including:

- listening to the signalling associated with the down link, for example to implement pre-emptive priority, i.e. the possibility (when all the mobile stations are to be asked to clear their respective channels in an emergency) of reaching not only the mobile stations which are receiving but also the mobile station which is sending, for example to send an APB to all vehicles in a common action group,

- detecting and/or measuring signals broadcast in adjacent cells in the case of a cellular network, for example to prepare for handover, i.e. the passage from one base station (one cell) to another;

- enabling each of two mobile stations which dialog directly with each other, without calls passing through the base station, to listen out in case the base station is attempting to reach it, for example to tell it that there is a more important call waiting (this is referred to in this document as "double-standby").

Implementing a "listen" function is very simple in TDMA mode, in which a call is made up of a succession of time slots, with one time slot per frame. All that is required is to switch to receive mode between the time slots of the same call, in order to listen, and then to revert to send mode. Although the time to change from one mode (send or receive) to the other is relatively long, the time between two time slots assigned to the same call, which is the duration of N−1 time slots in the case of a frame with N time slots in total, is always more than enough.

Obviously in the case of half-duplex FDMA transmission the fact that the mobile station sends continuously rules out the solution used in TDMA mode.

One object of the invention is to solve the various problems that arise on changing from TDMA mode to FDMA mode in a half-duplex radio system.

To be more precise, one object of the present invention is to provide a half-duplex FDMA digital radio system which enables a mobile station communicating with a base station to transmit signalling associated with a call without serious disturbance of traffic.

Another object of the invention is to provide a system of this kind enabling a mobile station in send mode to use a "listen" function, in particular to listen out for down link signalling, to detect and/or measure signals broadcast in adjacent cells, or to implement "double-standby".

SUMMARY OF THE INVENTION

The present invention consists in a digital half-duplex frequency division multiple access radio system in which a mobile station is either sending or receiving, wherein for each call between a mobile station and a base station, a first frequency is allocated for the up link direction (from the mobile station to the base station) and a second frequency is allocated for the down link direction (from the base station to the mobile station), the signals exchanged by said stations are organized in frames of predetermined fixed duration grouped into multiframes comprising a predetermined number of frames and each including at least one control frame, at least some of said control frames being listening frames during which the sending mobile station interrupts sending, switches to receive mode and, if appropriate, reverts to send mode.

The basic principle of the invention is thus to define a frame-multiframe structure for the signals exchanged between the mobile stations and the base stations, with two type of frame in each multiframe: a plurality of traffic frames and at least one control frame.

The control frame can be used either to send special data (including signalling) or to implement a "listen" function. When implemented, the "listen" function is operative for at least part of a control frame. Consequently, a mobile station that is sending can interrupt sending in order to listen without disturbing the traffic because it listens during a frame which does not convey any traffic. In this way it is possible to send control data and to have listening periods without this being detrimental to transmission of traffic.

The mobile stations are advantageously divided into groups, the mobile stations of the same group having a first frequency for the up link direction and a common second frequency for the down link direction, only one mobile station of a group being able to send at a time.

Accordingly, one group can correspond to the police department, another to the fire department, another to a fleet of taxis, and so on.

The change from receive mode to send mode in the mobile station is not instantaneous: a non-negligible "turn-around" time must be allowed for. Consequently, in one preferred embodiment of the invention the frame start time and the multiframe start time of the two transmission directions as seen from the base station are offset by an amount at least equal to the send/receive turnaround time.

Thus it is possible to eliminate or at least to reduce the time shift between the time at which a base station receives a frame and the time at which it retransmits its content in another frame. In this preferred embodiment the offset between the frame start time and multiframe start time of the two transmission directions (as seen from the mobile station) is reflected in the base station being allowed a certain time for preparing (in particular decoding/recoding) a frame received from one mobile station (up link direction) before sending it in a frame to another mobile station (down link direction).

The down link frames and multiframes are advantageously sent with a time-delay substantially equivalent to a quarter-frame relative to the up link frames and multiframes, in particular when each traffic frame includes a single coded data unit.

In another advantageous embodiment of the invention the up link frames and the multiframes are sent with a time-delay substantially corresponding to a quarter-frame relative to the down link frames and multiframes, respectively, in particular when each traffic frame includes two non-interlaced coded data units.

At least some of said control frames preferably include two data units, the duration of each of which is substantially equal to the duration of a half-frame. Thus the same control frame can contain two data units, for example, one addressed to the receiving mobile station and the other to the sending mobile station (which should change to receive mode during this control frame to listen to the second data unit).

Said control frames are preferably used by the sending mobile to carry out at least one of the operations selected from the group comprising the following operations:

listening to down link signalling associated with the call;

detecting and/or measuring the signals broadcast in adjacent cells, in the case of a cellular network;

sending upward signalling associated with the call;

receiving information directly from another mobile station.

A listening scheme is advantageously defined, assigning one of said operations to each control frame. In this way each mobile station knows which frames to listen to (for example, one control frame in five) or to use to send up link signalling.

In an advantageous embodiment of the invention a frame stealing procedure allows a data frame to be replaced with a stolen frame which can be used in a similar manner to the control frames. The stolen frames allow the mobile station to increase its listening times or the amount of up link signalling that it can send or, in the case of a mobile station at the limits of a cell, to devote more time to listening to adjacent cells. When a frame stealing procedure of this kind is implemented, the listening scheme advantageously further defines the function and the position of the stolen frames.

The system of the invention preferably includes the following steps for listening to down link signalling in one of said up link control frames:

changing from send mode to receive mode during the start of said up link control frame;

receiving at least one message contained in a down link control frame;

at the end of said up link control frame, changing from receive mode to send mode or, where applicable, interrupting the call.

This feature has a synergistic relationship to a feature discussed previously, whereby the frame start time and the multiframe start time of the two transmission directions as seen from the mobile station are offset.

Changing from send mode to receive mode at the start of a control frame occurs in a time slot corresponding to this offset between the two transmission directions. The change to receive mode thus occurs at the start of a frame or at the start of a down link data unit.

Likewise, in the other direction, changing from receive mode to send mode at the end of said control frame occurs during a time slot corresponding to this offset between the two transmission directions. The return to send mode naturally occurs at the start of an up link frame.

In a preferred embodiment of the invention a "direct mode" procedure allows two mobile stations to communicate directly, without the intermediary of the base station.

In direct mode, in both transmission directions, the frame start time and multiframe start time are advantageously one quarter-frame in advance of the down link frame start time and multiframe start time as seen from the base station.

In this way both mobile stations behave in the same manner with reference to the base station. Moreover, because of the offset between the start times of frames and multiframes exchanged between the mobile stations and the start times of frames and multiframes sent by the base station, the mobile stations can listen during a control frame for any message sent by the base station. This offset has the same purpose as when the call passes through the base station.

In an advantageous embodiment of the invention, in direct mode, in both transmission directions, the frame start time and the multiframe start time are delayed one quarter-frame relative to the down link frame start time and multiframe start time as seen from the base station.

Each multiframe preferably includes 18 frames, the last of which is a control frame.

The duration of a frame is advantageously in the order of 57 ms.

The invention also consists in a digital radio signal exchanged between a mobile station and a base station in a frequency division multiple access half-duplex system, the mobile stations being either in send mode or in receive mode, wherein for each call between a mobile station and a base station a first frequency is allocated for the up link direction (from the mobile station to the base station) and a second frequency is allocated for the down link direction (from the base station to the mobile station);

the signal is organized in frames of predetermined fixed duration grouped into multiframes comprising a determined number of frames including at least one control frame, at least some of said control frames being listening frames during which the sending mobile station interrupts sending, changes to receive mode and then, if appropriate, returns to send mode.

Other features and advantages of the invention will emerge from a reading of the following description of a number of preferred embodiments of the invention given by way of non-limiting illustrative example only and from the appended drawings.

BRIEF DESCRIPTION OF THE DRAWINGS

FIG. 2 shows a first embodiment of a frame/multiframe structure of the invention.

FIG. 3 shows the transfer in a base station of the content of an up link frame into a down link frame, in the case of a frame/multiframe structure as shown in FIG. 2.

FIG. 4 shows the function of listening for down link signalling in a mobile station, in the case of a frame/multiframe structure as shown in FIG. 2.

FIG. 5 shows a second embodiment of a frame/multiframe structure of the invention.

FIG. 6 shows the transfer in a base station of the content of an up link frame into a down link frame, in the case of a frame/multiframe structure as shown in FIG. 5.

FIG. 7 shows the function of listening for down link signalling in a mobile station, in the case of a frame/multiframe structure as shown in FIG. 5.

DETAILED DESCRIPTION OF THE PREFERRED EMBODIMENTS

A cellular radio network comprises a plurality of preferably adjacent cells covering a geographical area in which mobile stations can move. In the example described in detail below the network is a TETRA network. However, it is clear that the invention is not limited to this type of network and also concerns GSM networks, for example.

Figure 1:
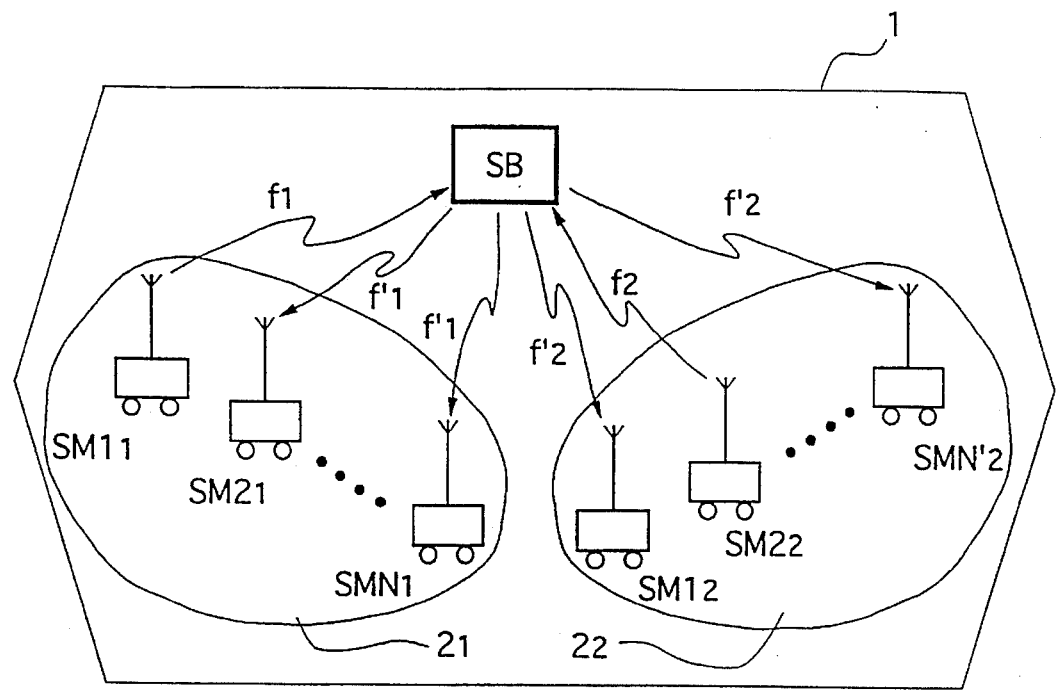
FIG. 1 is a schematic representation of part of a TETRA type cellular radio network in which the method of the invention can be implemented.

For simplicity, FIG. 1 shows only one cell 1 of the network. As a general rule, the mobile stations SM in each cell 1 set up calls via a base station SB covering the cell 1.

In the case of the TETRA system, the internal architecture of the infrastructure is not specified by the standard, but nevertheless the send-receive equipments of the structure will be referred to as base stations SB in the following description.

The invention concerns radio networks using the FDMA (Frequency-Division Multiple Access) technique. Thus for each call between a mobile station SM and a base station SB, a first frequency is allocated for the up link direction (from the mobile station to the base station) and a second frequency is allocated to the down link direction (from the base station to the mobile station).

In the specific example shown in FIG. 1 the mobile stations SM are divided into groups $2_1$, $2_2$. The mobile stations of the same group $SM_1$, through $SMN_1$, $SM1_2$ through $SMN'_2$ have a common first frequency $f_1$, $f_2$ for the up link direction (from a mobile station to the base station) and a common second frequency $f'_1$, $f'_2$ for the down link direction (from the base station to a mobile station). Also, only one mobile station of a group $2_1$, $2_2$ can send at a time. Thus in FIG. 1, in the first group $2_1$, only station $SM1_1$ is in send mode. The other N—1 stations being in receive mode.

The description concerns a half-duplex radio system, i.e. a system in which a mobile station cannot send and receive simultaneously. However, the base station can simultaneously send to some mobile stations and receive from other mobile stations $SM1_1$, $SM2_2$.

The invention consists in defining a particular structure for the signals exchanged in both directions between a base station associated with a cell and the mobile stations in that cell.

Figure 8:
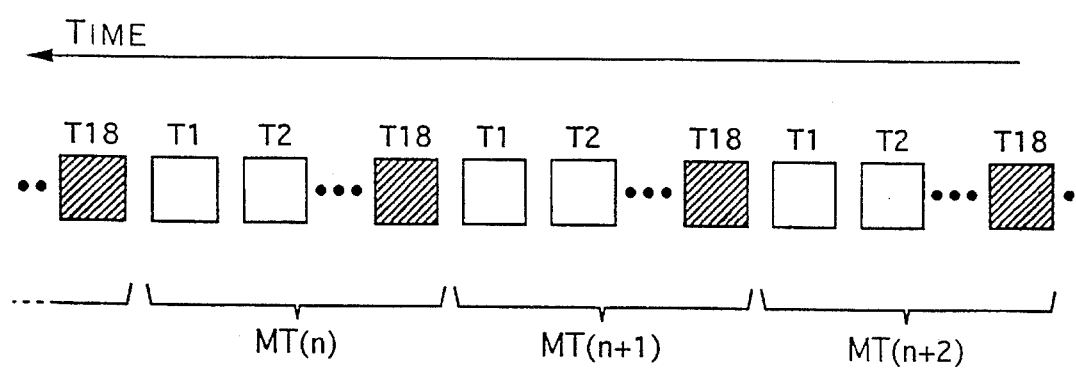
FIG. 8 shows one example of a frame and multiframe structure corresponding to the implementation of the method of the invention.

In accordance with the invention, and as shown in FIG. 8, in each transmission direction (up link or down link), time is divided into frames T1 through T18 of fixed and predetermined duration and the frames are grouped into multiframes MT(n) to MT(n+2) comprising a predetermined number of frames. A multiframe comprises traffic frames and at least one control frame.

In the example shown in the figure, each multiframe MT(n) to MT(n+2) comprises 17 traffic frames T1 through T17 and one control frame T18 (the last frame). The duration of a frame is on the order of 57 ms, for example.

The invention periodically releases a predetermined time period (the period of the control frame) for transmission other than transmission of traffic. Traffic transmission is interrupted, but in a predictable manner. It is therefore possible to reduce the disturbance to traffic caused by successive interruptions.

The mobile stations can use the control frames either for sending or for listening.

In the former case the mobile station in send mode can use the control frame to send the up link signalling associated with the call.

In the latter case the mobile station in send mode can use the control frame to implement a "listen" function. The mobile station must then change from send mode to receive mode during the control frame (called the "listening frame" in this context) and if necessary return to send mode to send the next traffic frame normally.

This "listen" function can correspond to various operations, depending on the nature of what is being listened to.

A first option is for the mobile station in send mode to listen out during a listening frame for down link signalling (i.e. signalling from the base station) associated with the call. This allows for the implementation of pre-emptive priorities, for example.

Another option is for the mobile station to detect and/or measure the signals broadcast in adjacent cells. This enables preparation for handover, for example.

Another option is for the mobile station to receive data direct from another mobile station (without using the base station, as an intermediary, as is usually the case).

A similar implementation can be used to enable a mobile communicating in this direct mode to listen out for any messages addressed to it from its base station.

A listening scheme is defined in order to allocate one option to each control frame. This scheme tells each mobile station how it must use its control frames. For example, a mobile station can use the control frames in the following manner:

two in five control frames are used to transmit up link signalling;

two in five control frames are used to listen to down link signalling; and one in five control frames is used alternately either to detect and/or measure signals broadcast in the adjacent cells or to receive data direct from another mobile station.

The remainder of the description concerns two particular embodiments of the invention in which the frame start time and multiframe start time of the two transmission directions (i.e. the up link direction and the down link direction) as seen from the mobile station are offset.

It is important to note that this offset is that as "seen" from the base station. Thus it does not allow for (and is different from) any offset due to different transmission times in the two directions.

In the first embodiment of the invention shown in FIGS. 2 to 4, the frames 21 (and respectively the multiframes) of the down link direction are sent with a time-delay approximately equal to the duration T/4 of one quarter-frame relative to the frames 22 or multiframes of the up link direction.

FIG. 2 shows this offset. The offset is chosen around a given value (the duration of a quarter-frame in this example) and is not strictly equal to that value. The turnaround times (from send mode to receive mode and vice-versa) for the mobile station can be different and this must be allowed for. Also, it is sometimes beneficial to have a shorter time-delay in order to recover control data preceding the wanted data in a frame.

FIG. 3 shows the transfer of the contents of an up link frame into a down link frame in a base station.

The base station receives and forwards frames: in particular, it decodes the content of each frame received, recodes it and then places it in a frame to be sent.

In the example shown each traffic frame comprises a single coded data unit the duration of which is substantially equal to that of the frame (for example 60 ms). It is clear that other solutions are feasible, however. Thus a frame might contain two data units, for example, of duration substantially equal to that of a half-frame (for example 30 ms).

To be able to prepare a received up link frame for forwarding it in the down link direction, the base station must have received all of the coded data unit contained in the receive frame. Because of the T/4 offset between the two directions, the base station has enough time to copy a ith traffic frame of a jth up link multiframe into the (i+1)th traffic frame of the jth down link multiframe (except for a traffic frame preceding a control frame, which is copied into the first frame following the traffic frame).

Thus with a multiframe of 18 frames and a control frame in 18th position, the content of the ith up link traffic frame is placed:

in the (i+1)th down link traffic frame (for i ∈ [1,16]), in the first traffic frame and the next down link multiframe (for i=17).

On copying from the up link direction to the down link direction the base station introduces a time-delay of:

five quarter-frames (5T/4) for frames 1 to 16, and nine quarter-frames (9T/4) for frame 17, because of frame 18 which is a control frame (this time-delay is equal to 5T/4+1T).

FIG. 4 illustrates the function of listening to down link signalling in a mobile station.

At the start ($D_{E \to R}$) of the up link control frame 42, the mobile station changes from send mode to receive mode. At the end ($DE_{\to R}$) of the up link control frame 42 the mobile station changes from receive mode to send mode (or interrupts the call). Between the start and the end of the up link control frame 42 the mobile station can receive (for a time $D_{LISTEN}$) a message contained in the down link control frame 41.

FIG. 4 shows one particular embodiment of the invention in which a down link control frame 41 comprises two data units 43, 44 the duration of which is substantially equal to that of one half-frame. Accordingly, between the start and the end of the up link control frame 42, the mobile station listens to the first data unit 43 which contains the down link signalling. The second data unit 44 is addressed to all the other mobile stations which are in receive mode (since only one station can send at a time) and can listen normally.

In the second embodiment shown in FIGS. 5 to 7 the up link frames 52 and the multiframes are sent with a time-delay approximately equal to the duration (T/4) of one quarter-frame relative to the down link frames 51 and the multiframes. This offset is shown in FIG. 5.

FIG. 6 shows the transfer of the content of up link frames into down link frames in a base station.

It is clear that the base station cannot copy into the (i+1)th down link traffic frame the content of the ith up link traffic frame since the (i+1)th down link traffic frame begins before the end of the ith up link traffic frame.

A first solution (not shown) is to place the content of the ith up link traffic frame in the (i+2)th down link traffic frame (for all values of i corresponding to the traffic frames except those preceding a control frame) or in the (i+3)th down link traffic frame—i.e. the first traffic frame of the next multiframe if the control frame is at the end of the multiframe (for i corresponding to the traffic frame or frames preceding a control frame).

Thus with a multiframe made up of 18 frames with a control frame in the 18th frame position, the content of the ith up link traffic frame is placed:

in the (i+2)th down link traffic frame (for i ∈ [1,15]), in the first traffic frame of the next down link multiframe (for i=16), in the second traffic frame of the next down link multiframe (for i=17).

With this first solution, when copying from the up link direction to the down link direction, the base station introduces a time-delay of:

seven quarter-frames (7T/4) for frames 1 through 15, and eleven quarter-frames (11T/4) for frames 16 and 17, because of frame 18 which is a control frame (this time-delay is equal to 7T/4 +1T).

FIG. 6 shows a second solution designed to reduce this time-delay.

This example covers the case of a traffic frame comprising two coded data units (each of 30 ms duration, for example). This is possible, for example, if the blocks (of 30 ms duration) from the speech coder are treated independently of each other (and not in pairs as is usually the case) by the channel decoder which then delivers packets (or data units) having the same duration as a half-frame (30 ms).

For ith frames where i ∈ [1,16], this means that:

the first up link data unit of an ith traffic frame is placed in the first half of the (i+1)th down link traffic frame, and the second up link data unit of an ith traffic frame is placed in the second half of the (i+1)th down link traffic frame.

For frame 17, since frame 18 is a control frame and does not transmit any traffic:

the first up link data unit of frame 17 is placed in the first half of the first frame of the next down link multiframe, and the second up link data unit of frame 17 is placed in the second half of the first frame of the next down link multiframe.

It is naturally possible to generalize this second solution to other cases in which the multiframe contains a distinct number of frames and one or more control frames are placed differently in the multiframe.

With this solution, when copying from the up link direction to the down link direction, the base station introduces a time-delay of:

three quarter-frames (3T/4) for the two data units of frames 1 through 16, seven quarter-frames (7T/4) for two data units of frame 17 (because of the control frame, this time delay is equal to 3T/4+T).

FIG. 7 shows the function of listening to down link signalling in a mobile station. Similar reasoning to that explained above in reference to FIG. 4 can readily show that the mobile station listens to the second data unit 74 which contains the down link signalling between the start and the end of the up link control frame 71. The first data unit 73 is addressed to all the other stations which can listen to it normally.

The system of the invention can include a frame stealing procedure and/or a direct mode procedure.

Frame stealing enables a data frame to be replaced by a stolen frame which can be used in a similar way to control frames. If frame stealing is used, the listening scheme discussed above must also define the function and the position of the stolen frames.

The direct mode procedure enables two mobile stations to communicate directly without using the base station as an intermediary.

In direct mode the frame start time and multiframe start time in both transmission directions between the two mobile stations are offset by an amount equal (for example) to the duration of one quarter-frame relative to the frame start time and multiframe start time of the down link direction, as seen from the base station.

In other words, both mobile stations which communicate with each other behave in the "conventional" way vis-à-vis the base station. In the embodiment of the invention described first with reference to FIGS. 2 through 4 or described second with reference to FIGS. 5 through 7 the offset therefore corresponds to an advance or a delay equal to the duration of one quarter-frame, respectively.

Specific embodiments of the invention have been described hereinabove with particular offsets (for example, an advance or delay equal to the duration of a quarter-frame between the two transmission directions) and particular configurations (for example, a control frame can contain two independent or non-independent data units). It is clear that many other embodiments of the invention can be envisaged without departing from the scope of the invention (in particular with other offsets and other configurations).

There is claimed:

1. Digital half-duplex frequency division multiple access radio system in which a mobile station is either sending or receiving, wherein for each call between a mobile station and a base station, a first frequency is allocated for the up link direction, from the mobile station to the base station, and a second frequency is allocated for the down link direction, from the base station to the mobile station, the signals exchanged by said stations are organized in frames of predetermined fixed duration grouped into multiframes comprising a predetermined number of frames and each multiframe including at least one control frame, at least some of said control frames being listening frames during which the sending mobile station interrupts sending, switches to receive mode and, if appropriate, reverts to send mode.

2. System according to claim 1 wherein said mobile stations are divided into groups, the mobile stations of the same group having a first frequency for said up link direction and a common second frequency for said down link direction, only one mobile station of a group being able to send at a time.

3. System according to claim 1 wherein the frame start time and the multiframe start time of the two transmission directions as seen from the base station are offset.

4. System according to claim 3 wherein, for listening to down link signalling in one of said up link control frames:

at the start of said up link control frame, the sending mobile station changes from send mode to receive mode;

said sending mobile station receives at least one message contained in a down link control frame;

at the end of said up link control frame, said sending mobile station changes from receive mode to send mode or, if appropriate, interrupts the call.

5. System according to claim 3 wherein the offset between said frame start time and said multiframe start time of said two transmission directions as seen from said base station has a duration at least equal to a send/receive turnaround time of said mobile station.

6. System according to claim 5 wherein down link frames and down link multiframes are sent with a time-delay substantially equivalent to the duration of one quarter-frame relative to up link frames and up link multiframes.

7. System according to claim 5 wherein up link frames and up link multiframes are sent with a time-delay substantially equivalent to the duration of one quarter-frame relative to down link frames and down link multiframes.

8. System according to claim 1 wherein at least some of said control frames include two data units the duration of which is substantially equivalent to the duration of one half-frame.

9. System according to claim 1 wherein said control frames are used by a sending mobile station to carry out at least one of the operations selected from the group comprising the following operations:

listening to down link signalling associated with the call;

detecting and/or measuring signals broadcast in adjacent cells in the case of cellular network;

sending up link signalling associated with the call;

receiving data directly from another mobile station.

10. System according to claim 9 wherein a listening scheme is defined assigning one of said operations to each of said control frames.

11. System according to claim 10, wherein a frame stealing procedure allows a data frame to be replaced with a stolen frame which can be used in a similar way to control frames.

12. System according to claim 11 wherein said listening scheme also defines the function and the position of said stolen frames.

13. System according to claim 1 wherein a frame stealing procedure allows a data frame to be replaced with a stolen frame which can be used in a similar way to control frames.

14. System according to claim 1 wherein a direct mode procedure allows two mobile stations to communicate directly without the intermediary of said base station.

15. System according to claim 14 wherein, in direct mode, in both transmission directions, the frame and multiframe start times are advanced one quarter-frame relative to the down link frame and multiframe start times as seen from the base station.

16. System according to claim 14 wherein in direct mode, in both transmission directions, the frame and multiframe start times are delayed by the duration of one quarter-frame relative to the down link frame and multiframe start times as seen from the base station.

17. System according to claim 1 wherein each multiframe comprises 18 frames the last of which is a control frame.

18. System according to claim 1 wherein the duration of a frame is in the order of 57 ms.

19. Digital radio signal exchanged between a mobile station and a base station in a frequency division multiple access half-duplex system, the mobile stations being either in send mode or in receive mode, wherein for each call between a mobile station and a base station a first frequency is allocated for the up link direction, from the mobile station to the base station) and a second frequency is allocated for the down link direction from the base station to the mobile station;

said signal is organized in frames of predetermined fixed duration grouped into multiframes comprising a predetermined number of frames including at least one control frame, at least some of said control frames being listening frames during which the sending mobile station interrupts sending, changes to receive mode and then, if appropriate, returns to send mode.

* * * * *